United States Patent [19]

Ritter et al.

[11] 4,228,774
[45] Oct. 21, 1980

[54] CONTROL APPARATUS FOR SUPERCHARGED FUEL INJECTION ENGINES

[75] Inventors: Ernst Ritter, Stuttgart; Josef Trui, Bietigheim-Bissingen; Manfred Krämer, Schwieberdingen, all of Fed. Rep. of Germany

[73] Assignee: Robert Bosch GmbH, Stuttgart, Fed. Rep. of Germany

[21] Appl. No.: 922,403

[22] Filed: Jul. 6, 1978

[30] Foreign Application Priority Data

Jul. 9, 1977 [DE] Fed. Rep. of Germany ....... 2731107

[51] Int. Cl.³ .............................................. F02D 1/06
[52] U.S. Cl. .................................... 123/562; 123/383
[58] Field of Search .......................... 60/605, 612; 123/119 CB, 119 C, 140 MP

[56] References Cited

U.S. PATENT DOCUMENTS 2,306,277  12/1942  Oswald ..................... 123/119 CB X

FOREIGN PATENT DOCUMENTS 1181488  2/1970  United Kingdom ..................... 60/612

*Primary Examiner*—Michael Koczo
*Attorney, Agent, or Firm*—Edwin E. Greigg

[57] ABSTRACT

A control apparatus is proposed for supercharged fuel injection engines, particularly for diesel engines having a V-type configuration that include two induction tubes, which apparatus enables the adjustment of the controller output range or the limitation of the full-load position of the delivery-amount adjusting member in the fuel measurement apparatus, depending upon which induction tube has the lower prevalent charge-air pressure. The control apparatus comprises a switch valve arranged in the control line to a pressure chamber of a correcting element which acts on the delivery-amount adjusting member; said correcting element has a valve member, controlled by the charge-air pressure, connecting the pressure chamber with an intake pressure line leading to the area of lower prevalent charge-air pressure.

9 Claims, 2 Drawing Figures

CONTROL APPARATUS FOR SUPERCHARGED FUEL INJECTION ENGINES

BACKGROUND OF THE INVENTION

The invention relates to a control apparatus for supercharged injection internal combustion engines, particularly diesel engines of a V-type configuration which have two induction tubes.

Known control apparatuses of this type work in dependence on the charge-air pressure in the induction tube of the engine. These devices have a correcting element which is acted upon by the charge-air pressure via the pressure chamber and either engages the regulating rod to adjust the regulator characteristic in accordance with the varying charge-air pressure, or else works as a full-load stop to limit the full-load position of the delivery-amount adjusting member to the extent which is permissible at that time. These apparatuses are connected with an intake tube of the motor only by a control line. If the motor has two intake tubes, however, different charge-air pressures can arise therein either because of load losses or because of the loading of a separate turbo-supercharger on each of them. Moreover, if the full-load amount in the fuel measurement apparatus is controlled according to only one of the charge-air pressures, this can lead to induction of an overly large amount of fuel into the cylinders which connect with the intake tube having the lower charge-air pressure at that particular time. This in turn can lead to an impermissible thermal overload of the particular cylinders or at the least to excess smoking of the engine.

OBJECT AND SUMMARY OF THE INVENTION

Compared with the above, the control apparatus of this invention has the advantage that it is very simple to set the range of controller output or the maximum permissible full-load position of the delivery-amount adjusting member in accordance with the lower prevalent charge-air pressure. In this way an overload of the engine or impermissible smoking is avoided. The switch valve can be installed either onto the regulator, the injection pump, or the appropriate charge-air pressure stop, or as a self-contained unit in the control line.

By means of characteristics further described in the application, advantageous improvements and further embodiments of the control apparatus are made possible as dislosed herein. A very small control apparatus can be designed by equipping the switch valve with a spool valve which can move freely between two end positions, and there are no difficulties of installation, since the valve may be installed either in the line or on an available housing. A blockage of the control line during operation is prevented by means of the valve member, which, in its neutral setting, connects both intake pressure lines with the control bore. A very sensitive control can be achieved even at small pressure differentials by means of the actuation of the valve member in one particular embodiment of the invention by an adjustment diaphragm, and a preferred operational setting can be preselected by arranging the relationship of the surfaces of communicating control chambers which are to be acted upon. Such a preferred operational setting can also be accomplished by the inclusion of a compression spring or by using two compression springs to effect a balance of force. By preselecting the initial stressing force of the compression spring holding the valve member at a preferred setting, it can be determined at what pressure differential the switch valve connects the section of the control line which is in communication with the pressure chamber with the corresponding intake pressure line.

The invention will be better understood as well as further objects and advantages thereof become more apparent from the ensuing detailed description of preferred embodiments taken in conjunction with the drawings.

DESCRIPTION OF THE PREFERRED EMBODIMENTS

Figure 1:
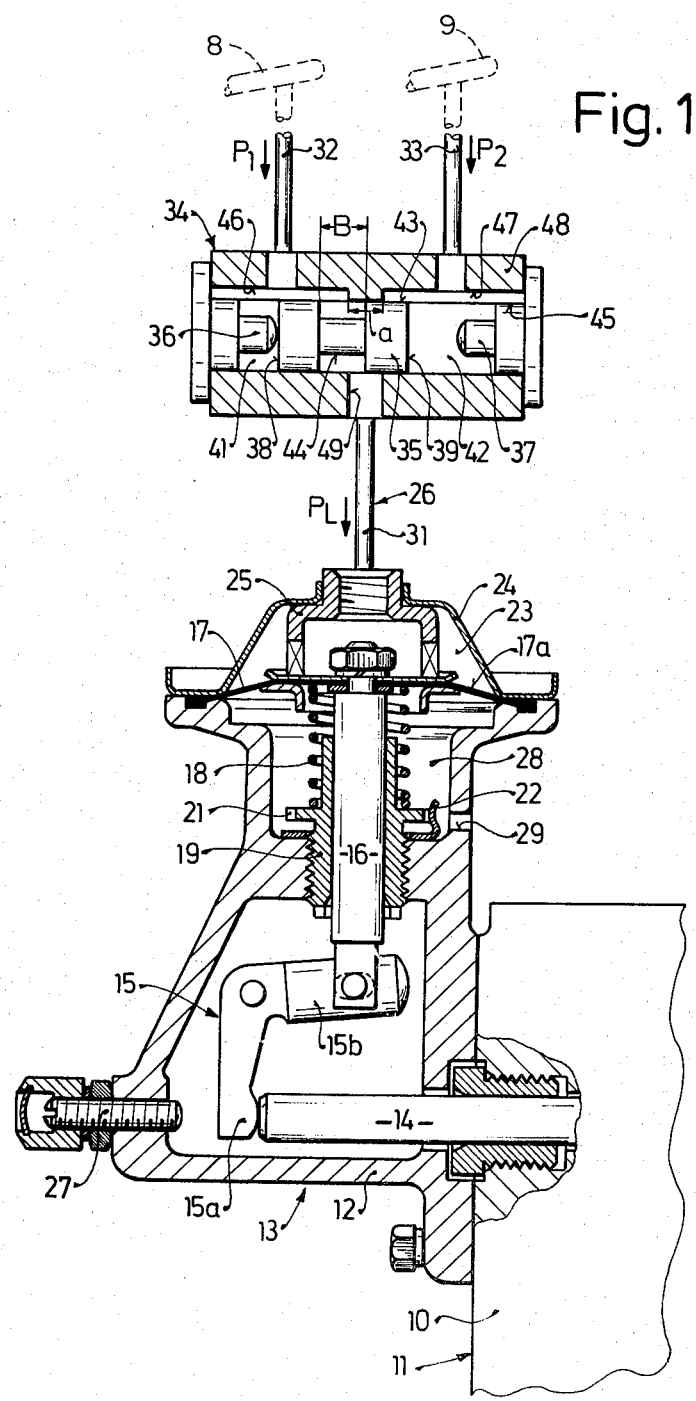
FIG. 1 is a cross-sectional view of the first exemplary embodiment of a control apparatus attached directly onto a fuel injection pump by means of a flange.

The housing 12 of an intake-pressure-dependent projection 13 which is correlated with the control apparatus of the invention is attached by a flange onto the pump housing 10 of a fuel injection pump 11 which serves as a fuel measurement apparatus. This projection 13 acts upon the regulating rod 14 which serves as the adjusting member for the amount of fuel delivered by the injection pump 11, in a known manner.

The projection 13 includes in its housing 12 a bell crank lever 15, one arm 15a of which serves as the full-load stop for the regulating rod 14 with the other arm 15b being coupled with a connecting rod 16 which serves as a correcting element and in turn is connected to an adjustment diaphragm 17. The connecting rod 16 that is associated with the adjustment diaphragm 17 operates against the force exerted by a return spring 18, which is supported on one end by the adjustment diaphragm 17 and on the other by a guide bushing 19 that is threaded into the housing 12, as shown. The guide bushing 19 is adjustable in the housing 12 by means of threads and is secured in a given position by an upstanding tongue portion 22 which engages into detents 21. A pressure chamber 23 which communicates with the pressure side 17a of the adjustment diaphragm 17 is formed by a housing cover 24 and contains a cup-shaped projection 25 which determines the initial or beginning position, as shown, of the connecting rod 16 and thereby the full-load position set by the arm 15a for the regulating rod 14 when the motor is operating at normal intake pressure. At an elevated charge-air pressure $p_L$, which is introduced into the pressure chamber 23 over a control line 26, the connecting rod 16 moves downward and rotates the bell crank 15 against the force of the return spring 18, until the lever arm 15a comes into contact with a projecting screw 27. By means of this screw, the highest permissible position of the regulator rod 14 is set for an accordingly high charge-air pressure. A chamber 28 opposite the pressure chamber 23 communicates with the atmosphere, that is, with the ambient air pressure, through a bore 29. The intake-pressure-dependent projection 13 serves to control the maximum permissible fuel amount in a supercharged diesel engine having two intake tubes 8, 9. Since differing pressures can arise in the two intake tubes, above all when each intake tube is supplied with supercharged air by a separate exhaust-driven turbo-supercharger, as is particularly the case with engines in V-type configuration, then the intake-pressure-dependent projection 13 should communicate with the particular intake tube in which the lower charge-air pressure prevails. For this reason there is a switch valve 34 included between a control line section 31 (part of the control line 26 and connected with the pressure chamber 23) and two intake pressure lines 32 and 33 which lead to the two intake tubes of the engine, the switch valve 34 having a valve member 35 embodied as a spool valve that moves freely between two end positions. These two end positions are limited by projections 36 and 37, and each frontal surface 38 and 39 of the spool valve member 35 communicates with a control chamber 41 and 42, into which the charge-air pressure $p_1$ or $p_2$ is introduced over the intake pressure lines 32 and 33 into the appropriate intake tube. The valve member 35 preferably has a control channel 44 of width B located medially of the inner walls of the spool valve, the channel 44 being embodied as a circular groove cut into the outer surface of the valve member.

Two grooves 46 and 47 cut inward from each frontal surface extend partially the length of the wall of a guide boring 45 of the spool valve 35 and at a distance a from each other. The dimensions of a and B are such that the smallest possible width B of the control groove 44 is larger than the largest possible distance a between the two lengthwise grooves 46 and 47. These two grooves 46 and 47 are so situated that in both end positions of the spool valve 35, one of the intake pressure lines 32 or 33 can communicate both with the control groove 44 of the spool valve 35 and with the appropriate control chamber 41 or 42, on which the same pressure is exerted. In every possible operational phase, the control groove 44 is connected with the control line section 31 which leads from a guide bore 45 to the pressure chamber 23, by means of a control bore 49 provided in the housing 48.

In the end position of the valve member 35 shown in FIG. 1, the intake pressure line 32 which carries the charge-air pressure $p_1$ is connected by means of the lengthwise groove 46 both with the control chamber 41 and the control groove 44 and communicates via the groove 44 and the control bore 49 as well as via the control line section 31 with the pressure chamber 23 of the intake-pressure-dependent projection 13. The charge-air pressure $p_1$, which in this case is the lower pressure, serves as the control pressure $p_L$, since the higher charge-air pressure $p_2$ is directed over the intake pressure line 33 and the lengthwise groove 47 to the control chamber 42 and thus exerts pressure on the frontal surface 39 of the spool valve 35, holding it in the left position, as shown in the drawing. The section of the valve member 35 which is adjacent to the control groove 44 on the side of the control chamber 42 thus closes the connection from the intake pressure line 33 to the control bore 49 and thereby to the control line section 31.

Since the distance a between the two lengthwise grooves 46 and 47 is always smaller than the width B of the control groove 44, the supply of the control pressure in the form of charge-air pressure $p_L$ to the pressure chamber 23 is never cut off, in any position of the spool valve. When the same charge-air pressure $p_1$ or $p_2$ prevails in both intake pressure lines 32 and 33, it is of no importance in what position the spool valve 35 is located. It can be in the end position shown or in the neutral middle position, where both intake pressure lines 32 and 33 communicate with the control line section 31.

Figure 2:
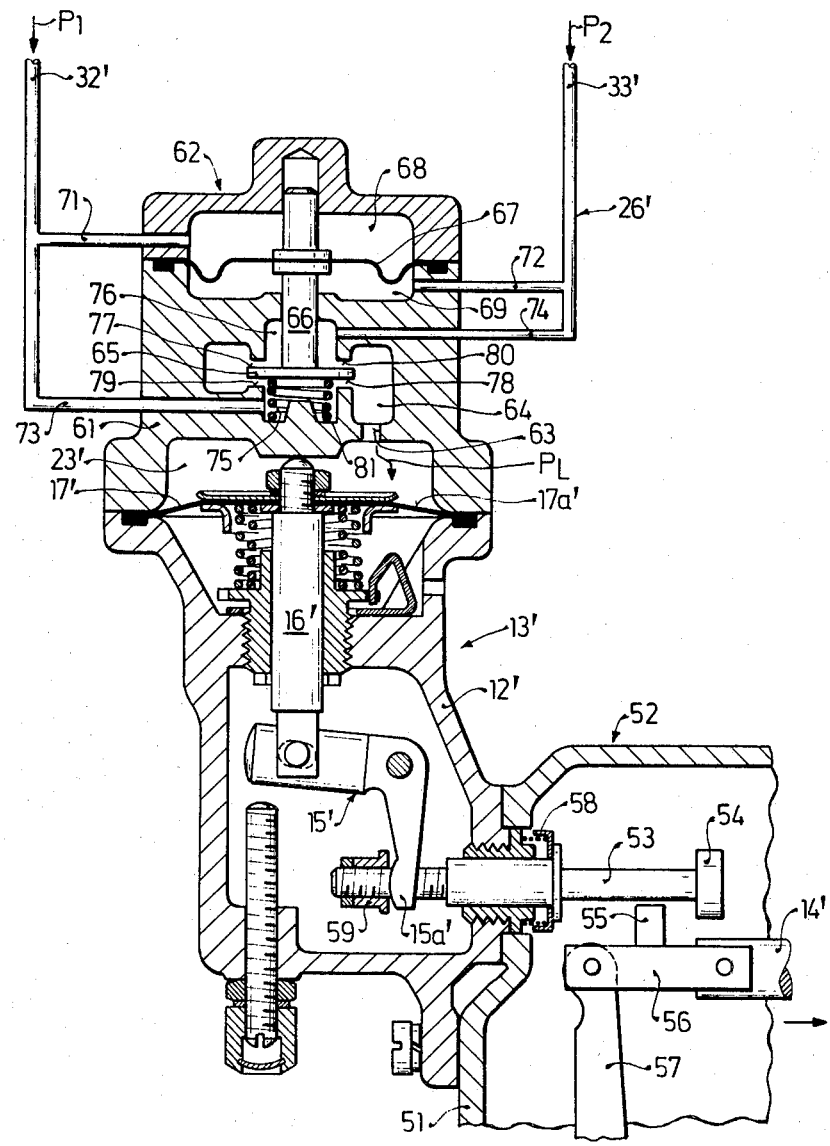
FIG. 2 is a cross-sectional view of the second exemplary embodiment wherein a control apparatus is installed in the regulator of an injection pump.

In the second exemplary embodiment of the invention shown in FIG. 2, the intake-pressure-dependent projection 13' is attached with its housing 12' by means of a flange onto a regulator housing 51 of a centrifugal rpm governor 52 of a fuel injection pump. (The parts corresponding to those in the first embodiment are given the same reference numbers with a prime.) The connecting rod 16' provided with an adjustment diaphragm 17' does not exert pressure directly on the regulating rod 14', which serves as the delivery-amount adjusting member in the particular injection pump, but rather exerts pressure on the bell crank 15' and and its arm 15a' and thereby limits the stroke of a stop bolt 53 which projects into the regulator housing 51 and limits the path of travel of an upstanding projection 55. The projection 55 extends out from a connecting element 56, which links a regulator lever 57 of the centrifugal rpm governor 52 with the regulating rod 14'. A play-eliminating spring 58 together with a lock nut 59 maintains the stop bolt 53 in contact with the arm 15a' of the bell crank 15'.

A housing 61 of a switch valve is set directly on top of the housing 12' of the intake-pressure-dependent projection 13'. This housing 61 replaces the housing cover 24 of FIG. 1 and further contains the pressure chamber 23' which communicates with the pressure side 17a' of the adjustment diaphragm 17' which is acted upon by the control pressure $p_L$. A control bore 63 serves in this embodiment as the control line section of the control line 26', which connects the pressure chamber 23' with a circular space 64 which serves as a control channel. The flow of charge-air to this circular space 64 is controlled by a valve plate 65 of a valve member 66. This valve plate 65 is located at one end of the valve member 66, which at its other end is provided with a control diaphragm 67 that separates the two control chambers 68 and 69. The first control chamber 68 is connected with the intake pressure line 32' which supplies the charge-air pressure $p_1$ over a connecting line 71, and the other control chamber 69 is connected to the second intake pressure line 33' which supplies the charge-air pressure $p_2$ over a connecting line 72. Each of a second pair of connecting lines 73 and 74 supplies the charge-air pressure prevalent in the intake pressure lines 32' and 33' to each of the valve chambers 75 and 76. The connection between these two valve chambers 75 and 76 and the control channel 64 which is embodied as a circular space is determined through the valve plate 65 by means of each of a pair of annular valve seats 79 and 80 located opposite both frontal surfaces 77 and 78 of the valve plate 65. A return spring 81 that is located in the valve chamber 75 serves to balance the weight of the valve member 66 and can be designed, in accordance with the demand placed on the control function, in such a way that it holds the valve member 66 in its neutral middle position, as shown, whenever both intake pressure lines 32' and 33' supply the same pressure. If one of the lines has a higher pressure than the other, then one of the valve seats 79 or 80 is closed by the valve plate 65, and the other valve seat connects the circular space 64 either with the intake pressure line 32' or with the intake pressure line 33'. The initial stressing force of the compression spring 81 can, however, also be so designed that the valve member 66 takes a preferred end position and only switches over to another operational phase at a preselected pressure differential.

It is likewise possible to provide a second compression spring which counteracts the force of the first compression spring 81 within the valve chamber 76, and to give both compression springs a certain initial stressing force. Then the valve member remains in its neutral middle position until the preselected pressure differential between the two intake pressure lines 32' and 33' is attained.

This arrangement of compression springs can also obviously be employed with the valve member 35 of the first exemplary embodiment, which is embodied more or less as a control piston.

Although the function of the control apparatus according to the invention may be inferred from the foregoing description, it will now be explained in detail as to operation with the aid of the drawings.

METHOD OF OPERATION

In the first exemplary embodiment of this invention, shown in FIG. 1, whenever there is a higher charge-air pressure $p_2$ in the intake pressure line 33 than in the intake pressure line 32, then the spool valve 35 is moved to or held in the left hand position, as shown in the drawing, by the pressure in control chamber 42. This action closes off the connection between the intake pressure line 33 and the control line section 31 that leads to pressure chamber 23, while the intake pressure line 32 which has the lower charge-air pressure $p_1$ is connected with pressure chamber 23 via the lengthwise groove 46, the control groove 44, the control bore 49, and the control line section 31. The intake air pressure $p_L = p_1$ in this pressure chamber is exerted on the pressure side 17a of the adjustment diaphragm 17 and moves the controlling rod 16 of the intake-pressure-dependent projection 13 against the force of the return spring 18 into a position of balance between the restraining force of return spring 18 and the pressure in pressure chamber 23. At this time, the bell crank 15 moves into a position where its arm 15a limits the maximal position of the regulating rod 14 of the injection pump 11 to a setting which corresponds to the delivery of the full-load fuel amount associated with the charge-air pressure $p_L$.

If the pressure in the intake pressure line 33 falls below the pressure $p_1$ in the intake pressure line 32 for any reason, the higher pressure which would then prevail in control chamber 41 would move the spool valve 35 into its right hand position, not shown in the drawing, in which its frontal surface 39 then comes into contact with the stop 37. Now the connection from the intake pressure line 32 to the control line section 31 is closed off and the charge-air pressure $p_2$ that prevails in the intake pressure line 33, which is now the lower value, can proceed via the lengthwise groove 47, the control groove 44, the control bore 49 and the control line section 31 to the pressure chamber 23.

The control apparatus of the second exemplary embodiment of this invention, according to FIG. 2, operates in a similar manner, except that here the control chambers 68 and 69 can be embodied as much larger units, enabling a more sensitive adjustment of the valve member 66. In this example the control function which serves to move the valve member 16' is separated from the valve function carried out by the valve plate 65. If a lower charge-air pressure $p_1$ prevails in the control chamber 68 than in the control chamber 69, then the charge-air pressure $p_2$ acts via the control chamber 69 on the control diaphragm 67 to move the valve member 66 upward, and the frontal surface 77 of the valve plate 65 comes into contact with the annular valve seat 80 and closes off the connection between the intake pressure line 33' and the pressure chamber 23'. Simultaneously the connection from the intake pressure line 32' via the connection line 73 to the circular space 64 which serves as a control channel is opened, and the charge-air pressure $p_1$ can proceed as control pressure $p_L$ via the control bore 63 into the pressure chamber 23'; from this point the charge-air pressure is exerted upon the adjustment diaphragm 17' and moves the control rod 16', which serves as an adjustment member, into a position in which the bell crank 15' effects a change in position of the stop bolt 53, whose head 54 serves to limit the highest permissible amount of full-load injection.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A control apparatus for supercharged fuel injection internal combustion engines such as diesel engines having two induction tubes and a fuel measurement apparatus having a delivery-amount adjustment member and provided with adjustable means for varying the range of the full-load position of said delivery-amount adjustment member of said fuel measurement apparatus, return means and charge-air pressure responsive means movable against the force of said return means connected to the adjustable means comprising, a pair of intake pressure lines each connected to one of the induction tubes of the engine, a switch valve having an interior defining a pair of separately disposed control chambers each of said control chambers connected to one of said intake pressure lines, a control line for connecting said switch valve to a pressure chamber to which said charge-air pressure responsive means is exposed, a valve member disposed in said switch valve interior for movement by the higher of the charge-air pressures in one of the control chambers into a position for communication of the intake pressure line having the lower charge-air pressure through the control line with the pressure chamber to which the charge-air pressure responsive means is exposed.

2. A control apparatus in accordance with claim 1 wherein said switch valve is provided with a guide bore and wherein said valve member comprises a valve spool freely movable in said guide bore between two end positions, said valve spool having end faces each adjacent one of said control chambers, said valve spool being provided with a control channel intermediate said end faces for communicating alternately one of said intake pressure lines in each of said end positions with said control line.

3. A control apparatus in accordance with claim 2 wherein said control channel is an annular groove within the outer surface of said valve spool, said control channel having a width to permit communication between both of said intake pressure lines and said control line in an intermediate position of said valve spool between said two end positions.

4. A control apparatus in accordance with claim 2 wherein the inner wall of said guide bore is provided with a pair of axially extending grooves, one of said grooves being arranged to communicate one of said intake pressure lines with both one of said control chambers and said control channel in one end position of said valve spool, the other of said grooves being arranged to communicate the other of said intake pressure lines with both the other of said control chambers and said control channel in the other end position of said valve spool, with said control channel being maintained in communication with said control line in any position of said valve spool.

5. A control apparatus in accordance with claim 4 wherein the adjacent ends of said axially extending grooves are disposed in spaced-apart relationship to define an uninterrupted portion and wherein the smallest possible width of said control channel is greater than the largest possible distance between said axially extending grooves.

6. A control apparatus in accordance with claim 1 wherein said control chambers are disposed in adjacent relationship and are separated by a control diaphragm, and wherein one end of said valve member is disposed adjacent said control chambers, a valve closing member on the other end of said valve member for selectively connecting one of said intake pressure lines with said control line communicating with said pressure chamber while interrupting the communication between the other of said intake pressure lines and said control line.

7. A control apparatus in accordance with claim 6 wherein said closing member comprises a valve plate forming a double seat valve and including a pair of annular valve seats each opposite one of the end faces of said valve plate and engageable by the associated end face for controlling the connection of said intake pressure lines with said pressure chamber.

8. A control apparatus in accordance with claim 7 including at least one compression spring yieldingly engageable with said valve member for yieldingly maintaining said valve member in an intermediate position between said annular valve seats which constitutes a preferred operational position.

9. A control apparatus in accordance with claim 8 wherein said compression spring is arranged to yield upon the presence of a pressure differential in said control chambers which is in excess of a predetermined magnitude and permit said valve plate to move from said intermediate position into one of its end positions in closing engagement with one of said annular valve seats.

* * * * *